United States Patent
Zhang et al.

(10) Patent No.: US 12,287,731 B2
(45) Date of Patent: Apr. 29, 2025

(54) METHOD AND DEVICE FOR STORING DATA

(71) Applicant: SAMSUNG ELECTRONICS CO., LTD., Suwon-si (KR)

(72) Inventors: Yuqi Zhang, XiAn (CN); Ni Xue, XiAn (CN); Yangxu Zhou, XiAn (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 17/705,636

(22) Filed: Mar. 28, 2022

(65) Prior Publication Data

US 2023/0153237 A1    May 18, 2023

(30) Foreign Application Priority Data

Nov. 16, 2021 (CN) .......................... 202111357303.5

(51) Int. Cl.
*G06F 12/00* (2006.01)
*G06F 12/02* (2006.01)

(52) U.S. Cl.
CPC .. *G06F 12/0253* (2013.01); *G06F 2212/7205* (2013.01)

(58) Field of Classification Search
USPC ....................................................... 711/154
See application file for complete search history.

(56) References Cited

U.S. PATENT DOCUMENTS

| | | | |
|---|---|---|---|
| 7,890,550 B2 * | 2/2011 | Jung | G06F 12/0246 707/819 |
| 8,402,242 B2 | 3/2013 | Hu et al. | |
| 9,430,376 B2 | 8/2016 | Horn | |
| 9,846,542 B2 | 12/2017 | Seo et al. | |
| 10,558,616 B2 | 2/2020 | Shin et al. | |
| 11,726,869 B2 * | 8/2023 | Iwasaki | G06F 12/0253 714/764 |
| 2012/0151124 A1 * | 6/2012 | Baek | G06F 12/0246 711/E12.008 |
| 2016/0179422 A1 | 6/2016 | Lee | |
| 2016/0188227 A1 | 6/2016 | Yang et al. | |
| 2018/0196745 A1 | 7/2018 | Karr et al. | |
| 2018/0307596 A1 | 10/2018 | Pandurangan et al. | |
| 2019/0079861 A1 * | 3/2019 | Amaki | G11C 29/42 |
| 2020/0174668 A1 * | 6/2020 | Byun | G06F 12/0253 |
| 2023/0297501 A1 * | 9/2023 | Wang | G06F 12/0653 711/154 |

* cited by examiner

*Primary Examiner* — Mardochee Chery
(74) *Attorney, Agent, or Firm* — Sughrue Mion, PLLC

(57) ABSTRACT

A method for storing data includes receiving a message to perform garbage collection on a first block of blocks included in a storage apparatus, and, based on the message, performing garbage collection on the first block by storing valid data that is stored in the first block into a second block according to a level of the first block among plural levels. A level of the second block among the plural levels is not lower than the level of the first block.

18 Claims, 11 Drawing Sheets

METHOD AND DEVICE FOR STORING DATA

CROSS-REFERENCE TO RELATED APPLICATION

The present Applicant claims priority to Chinese Patent Application No. 202111357303.5 filed on Nov. 16, 2021 in China, the entire contents of each of which being herein incorporated by reference in its entirety.

BACKGROUND

The present disclosure relates to the storage field and, more specifically, to a method and device for storing data.

Recently, storage devices, such as Solid State Drive (SSD), Non-Volatile Memory Express (NVMe), Embedded Multi Media Card (eMMC), Universal flash memory (UFS), etc., have been widely used. In the process of using the storage device, the garbage collection (GC) performance of the storage device is an indicator that needs to be especially considered.

Garbage collection (GC) generally refers to an operation of storing valid data in a source block in a storage device to a target block and erasing the source block. In related art garbage collection, cold data (that is, data with a long life cycle) may not be invalid for a long time, and may be stored or copied many times in the GC, causing an increase in GC overhead, which leads to the increase of the write amplifications (WAFs) and the decrease of the performance of the storage device.

SUMMARY

It is an aspect to provide a method and a device for storing data.

According to an aspect of one or more embodiments, there is provided a method of storing data, the method comprising receiving a message to perform garbage collection on a first block of a plurality of blocks included in a storage apparatus; and based on the message, performing the garbage collection on the first block by storing valid data that is stored in the first block into a second block according to a level of the first block among a plurality of levels, wherein a level of the second block among the plurality of levels is not lower than the level of the first block.

According to another aspect of one or more embodiments, there is provided a device comprising a storage apparatus that is divided into a plurality of blocks; and a processor configured to receive a message to perform garbage collection on a first block of the plurality of blocks; and based on the message, performing the garbage collection on the first block by storing valid data that is stored in the first block into a second block according to a level of the first block among a plurality of levels, wherein a level of the second block among the plurality of levels is not lower than the level of the first block.

According to yet another aspect of one or more embodiments, there is provided a non-transitory computer-readable storage medium storing a computer program, which, when executed by a processor, causes the processor to receive a message to perform garbage collection on a first block of a plurality of blocks included in a storage apparatus; and based on the message, perform the garbage collection on the first block by storing valid data that is stored in the first block into a second block according to a level of the first block among a plurality of levels, wherein a level of the second block among the plurality of levels is not lower than the level of the first block.

According to additional aspects of one or more embodiments, there are also provided an electronic system, a host storage system, a storage system, an universal flash memory system, and a data center configured to store data consistent with the method as described above.

BRIEF DESCRIPTION OF THE DRAWINGS

The above and other aspects will become clearer by the following description in conjunction with the accompanying drawings, in which.

DETAILED DESCRIPTION

Figure 1:
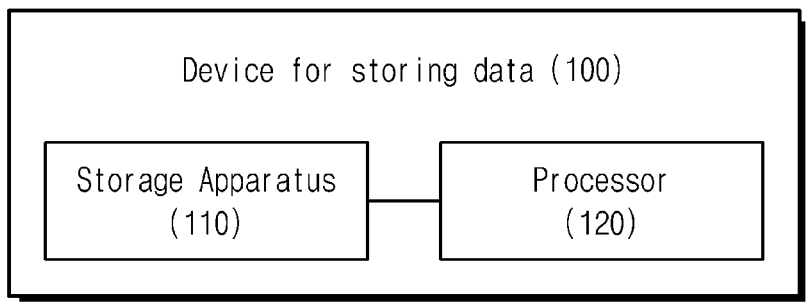
FIG. 1 is a block diagram showing a storage device according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, the component may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a "first" member, component, region, layer, or section referred to in examples described herein may also be referred to as a "second" member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

According to various embodiments, a method of storing data described herein may store valid data in a first block into a second block of a level not lower than a level of the first block in a garbage collection (GC) process, so that the valid data to be stored (or copied) is stored hierarchically in different blocks to reduce the possibility of multiple GCs for data (in particular data with a long life cycle called cold data), thereby reducing write amplification and improving the performance of a storage apparatus.

The method of storing data according to various example embodiments may assign different levels to hot blocks and cold blocks in advance according to properties of the hot blocks and cold blocks for subsequent garbage collection, thereby when using hot and cold blocks with different levels to perform garbage collection, the method may reduce the possibility of multiple GCs for data, thereby reducing write amplification and improving the performance of a storage apparatus.

The method of storing data according to various example embodiments may configure empty blocks according to a cases of empty blocks of different levels, so as to meet the needs of data migration in garbage collection.

The method of storing data according to various example embodiments may allocate empty blocks to the levels based on the program/erase counts of the empty blocks, so that the program/erase count of the blocks may be balanced.

According to the method of storing data according to various example embodiments, when allocating empty blocks, the program/erase counts of the empty blocks assigned to a relatively high level may not be lower than the program/erase count of the empty blocks assigned to a relatively low level, so that the program/erase counts of blocks may be balanced, and the method is more conducive to wear-leveling and can improve the life of the storage apparatus.

The method of storing data according to various example embodiments may consider a data duration of the first block and a data durations of blocks of other levels to determine the level of the second block for storing the valid data in the first block. Thus, the method of determining the level according to various example embodiments may settle the colder data to a higher level faster, so that the data of different heat levels may be separated faster, and the possibility of valid data being moved multiple times in multiple GCs is reduced.

Hereinafter, various example embodiments will be described in detail with reference to the accompanying drawings.

FIG. 1 is a block diagram showing a storage device according to an example embodiment.

Referring to FIG. 1, the device 100 for storing data may include a storage apparatus 110 and a processor 120. Although not shown in FIG. 1, the device 100 for storing data may be connected to an external memory and/or communicate with an external device. The device 100 for storing data shown in FIG. 1 may include components associated with the current example. Therefore, it will be clear to those skilled in the art that the device 100 for storing data may further include other general components in addition to the components shown in FIG. 1.

Here, the device 100 for storing data may be any storage apparatus that may perform garbage collection. As an example only, the device 100 for storing data may include a random access memory (RAM) (such as a dynamic random access memory (DRAM) or a static random access memory (SRAM)), a read only memory (RAM), an erasable programmable read-only memory (EEPROM), a CD-ROM, a Blue-ray disc, an optical disc storage device, a hard disk drive (HDD), a solid state drive (SSD) and/or a flash memory.

In addition, the device 100 for storing data may be implemented in various types of devices such as a personal computer (PC), a server device, a mobile device, an embedded device, and the like. In detail, the device 100 for storing data may be included in a smart phone, a tablet device, an augmented reality (AR) device, an Internet of Things (IoT) device, an autonomous vehicle, a robotic device, or a medical device that may store data, but is not limited to thereof.

The storage apparatus 110 may be divided into a plurality of blocks for storing data. For example, the plurality of blocks may include a first block and a second block. The first block and the second block may be used to store various data processed in the device 100 for storing data.

The processor 120 may control the overall functions of the device 100 for storing data. For example, the processor 120 may generally control the device 100 for storing data by executing a program stored in the storage apparatus 110. The processor 120 may be implemented as a central processing unit (CPU), a graphics processing unit (GPU), or an application processor (AP) included in the device 100 for storing data, but example embodiments are not limited thereto.

Here, the processor 120 may control a garbage collection operation of the device 100 for storing data. For example, when an instruction is executed in the processor, the processor 120 may be configured to receive a message to perform garbage collection on the first block in the storage apparatus, and store valid data that is stored in the first block into a second block to perform garbage collection on the first block according to a level of the first block, in response to the message, where a level of the second block is not lower than the level of the first block.

That is to say, the device 100 for storing data may store the valid data that is stored in the first block into the second block of a level not lower than the level of the first block in the garbage collection (GC) operation, so that the valid data to be stored (or copied) is stored hierarchically in different blocks to reduce the possibility of multiple GCs for data (especially data with a long life cycle called cold data), thereby reducing write amplification and improving the performance of the storage apparatus.

Hereinafter, an example of a method of storing data executed by the processor 120 will be described with reference to FIGS. 2 to 6.

Figure 2:
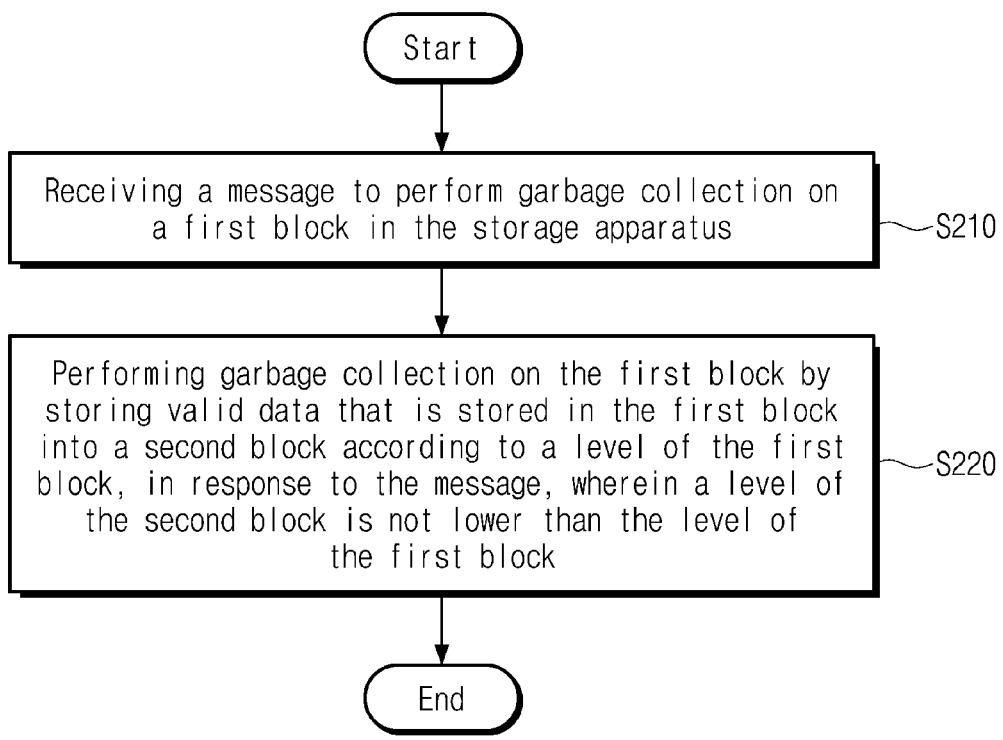
FIG. 2 is a diagram illustrating a method of storing data performed by a processor according to an example embodiment.

FIG. 2 is a diagram illustrating a method of storing data performed by a processor according to an example embodiment.

Referring to FIG. 2, in step S210, the processor 120 may receive a message to perform garbage collection on a first block in the storage apparatus.

Here, the message to perform garbage collection on the first block in the storage apparatus may be generated by various sources (for example, an external source or the processor 120 itself).

In step S220, in response to the message, the processor 120 may perform garbage collection on the first block by storing the valid data that is stored in the first block into a second block according to a level of the first block, wherein a level of the second block is not lower than the level of the first block.

The method of storing data may store the valid data that is stored in the first block into the second block of a level not lower than the level of the first block in the garbage collection (GC) process, so that the valid data to be stored (or copied) is stored hierarchically in different blocks to reduce the possibility of multiple GCs for data (especially data with a long life cycle called cold data) in the GC, thereby reducing write amplification and improving the performance of the storage device. In addition, the method of storing data may also be easy to be implemented.

The step S220 is described with a non-limiting example to help increase understanding. However, example embodiments are not limited to the non-limiting specific examples described below, and any specific parameter values in the described examples may be any other parameter values. In addition, the method of how to determine the level of the second block will be described in detail later in conjunction with FIG. 4.

In a non-limiting example, at least part of blocks included in the storage apparatus are configured as a zeroth level to an Mth level, where M is a positive integer. That is, each block of the at least part of blocks in the storage apparatus may correspond to one level from the zeroth level to the Mth level. Level information corresponding to the level is stored in a block attribute table. That is, the block attribute table may include level information indicating a level of a block. It may be understood that the level of the block reflects the hot level and the cold level of the stored data. In this application, the higher the level of the block, the colder the data stored in the block, and conversely the lower the level of the block, the hotter the data stored in the block. A block storing cold data may be referred to as a cold block, and a block storing hot data may be referred to as a hot block Here, the levels of the at least part of blocks may be determined and/or configured in advance. For example, the levels of the at least part of blocks may be configured in various ways. For example, the levels may be randomly assigned to the at least part of blocks. For another example, the levels may be assigned to the at least part of blocks divided into multiple groups. That is, the at least part of the blocks may be divided into a first group, a second group, etc. and the blocks in the first group may be assigned a level, and the blocks in the second ground may be assigned a level, and so on.

In some embodiments, the levels may be assigned to the at least part of blocks according to various attributes (such as, but not limited to, a program time, a garbage collection time, and/or a program erase count, etc.) of the blocks, so that the level assigned to the cold block is not lower than the level assigned to the hot block, where the cold block may have attributes suitable of storing cold data, and the hot block may have attributes more suitable of storing hot data compared with the cold block. For example, only as an example, a hot block may be a block suitable for data (for example, hot data) that is frequently erased and/or written, and a cold block may be a block suitable for data (for example, cold data) that is less erased and/or written. For another example, hot blocks may be blocks with a smaller proportion of valid data, and cold blocks may be blocks with a larger proportion of valid data. However, the above examples are only exemplary, and example embodiments are not limited thereto. Since different levels may be assigned to hot blocks and cold blocks in advance according to the properties of the blocks for subsequent garbage collection, when using hot blocks and cold blocks with different levels to perform garbage collection, it may be possible to reduce the possibility of multiple GCs for data, thereby reducing write amplification and improving the performance of the storage apparatus.

Correspondingly, there may be one or more blocks in the storage device that are not configured with levels or that have no levels. For example, the processor 120 may determine that the first block is not allocated with a level after receiving a message to perform garbage collection on the first block in the storage apparatus. In such a situation, the processor 120 may configure the level of the first block as the zeroth level.

Various implementation manners of configuring a block as the zeroth level may be used. For example, in some example embodiments, the levels of the at least part of blocks of the storage apparatus may be configured in advance. In some other example embodiments, the levels of the at least part of blocks of the storage apparatus may be configured as the zeroth level by default. In still other example embodiments, the levels of the at least part of blocks of the storage apparatus may not be configured in advance, and may be configured from the zeroth level when initially performing GC on the blocks.

In addition, after the processor 120 receives the message to perform garbage collection on the first block in the storage apparatus, the processor 120 may determine whether there is an empty block with a level of the second block in the storage apparatus. If the processor 120 determines that blocks corresponding to the level of the second block cannot be written, the processor 120 may configure the empty block for the level of the second block. In this situation, the processor 120 may store the valid data of the first block into the newly configured empty block.

In other words, the storage apparatus according to various example embodiments may configure empty blocks according to the cases of empty blocks of different levels, so as to meet the needs of data migration in garbage collection.

In some embodiments, the block attribute table may also include the program/erase count of each block (for example, for each block with a level, or for all blocks) in the storage apparatus, and empty blocks may be allocated to the levels based on the program/erase counts of the empty blocks, so that the program/erase count of the blocks may be balanced.

Specifically, an empty block with a first program/erase count may be preferentially configured for the level of the second block, wherein the first program/erase count is not lower than the second program/erase count of the empty block configured for a level lower than the level of the second block. That is to say, when allocating empty blocks, the program/erase counts of the empty blocks assigned to a relatively high level may not be lower than the program/erase count of the empty blocks assigned to a relatively low level, so that the program/erase counts of blocks may be balanced. This configuration may be conducive to wear-leveling and may improve the life of the storage apparatus.

After the processor 120 performs garbage collection on the first block, the processor 120 may configure the level of the first block as the zeroth level. However, example embodiments are not limited to thereof and, in some example embodiments, the processor 120 may configure the level of the first block to another level, or reset the level of the first block to an empty block after performing garbage collection on the first block.

Figure 3:
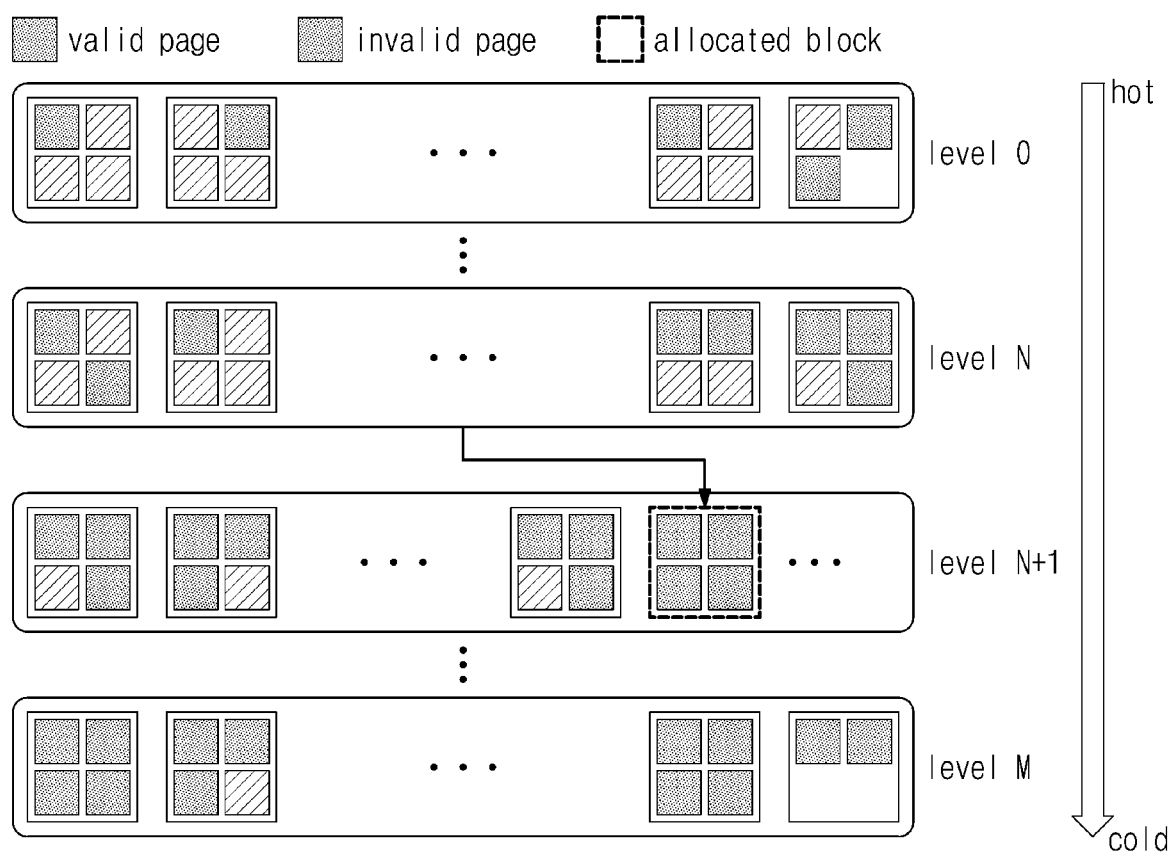
FIG. 3 is a schematic diagram of a method of storing data according to an example embodiment.

FIG. 3 is a schematic diagram of a method of storing data according to an example embodiment.

Referring to FIG. 3, at least part of blocks of the storage apparatus may be configured as a level from among multiple levels (i.e., level 0 (or referred to as the zeroth level) to level M (or referred to as the Mth level)). At least one of the at least part of blocks may correspond to at least one of valid pages and invalid pages. Here, a valid page may indicate a page in which valid data is stored, and an invalid page may indicate a page in which invalid data is stored.

As shown in FIG. 3, valid data in the blocks of a lower level may be stored in the blocks of a higher level. More specifically, in the example of FIG. 3, the valid data of the block of a level N may be stored in the block of level N+1. However, the example in FIG. 3 is only exemplary, and example embodiments are not limited thereto. In the example illustrated in FIG. 3, a higher level indicates that the data in the block is colder. That is to say, the method of storing data according to an example embodiment may store valid data by using multiple hierarchical blocks in garbage collection, so that data of different life cycles may be separated, thereby reducing the possibility of valid data being moved multiple times in multiple GCs.

In some example embodiments, blocks of a level may also be allocated blocks according to circumstances. During garbage collection, the processor 120 may select a level to place the valid data in a block. When the processor 120 in garbage collection (GC) selects a level N block, the valid data in the level N block will be copied to a level N+1 block, as illustrated in FIG. 3, and the level information of the allocated block will be updated accordingly. When a block is erased, the level information will be reset to 0. Thus, data that is initially written are stored in level 0, and the valid data that is copied in garbage collection will sink gradually as the number of copies increases. Through the multi-level placement of valid data during garbage collection, data with different lifetimes are separated, thereby reducing the possibility of valid data being copied multiple times in multiple garbage collections. For example, referring to FIG. 3, empty blocks of level N+1 may be allocated to blocks from a lower level. That is, as illustrated in FIG. 3, an empty block in level N+1 may be allocated to a block from level N during garbage collection (GC).

Figure 4:
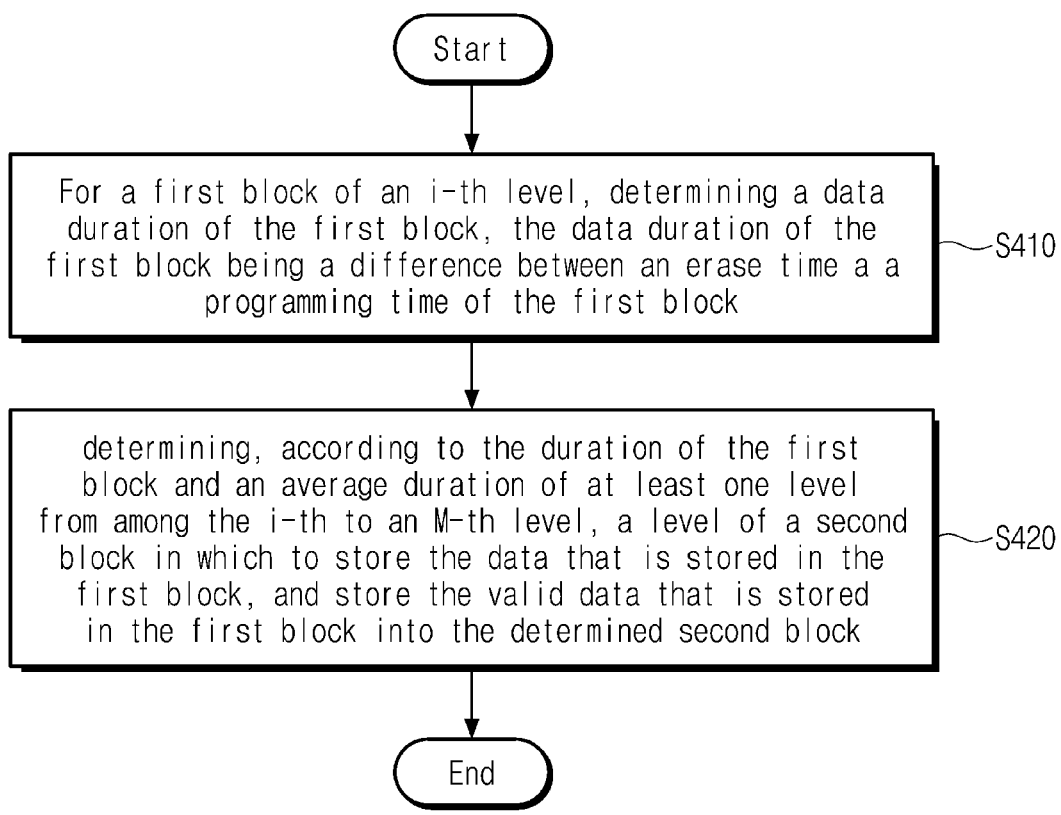
FIG. 4 illustrates a method of determining a level of a block according to an example embodiment.
Figure 5:
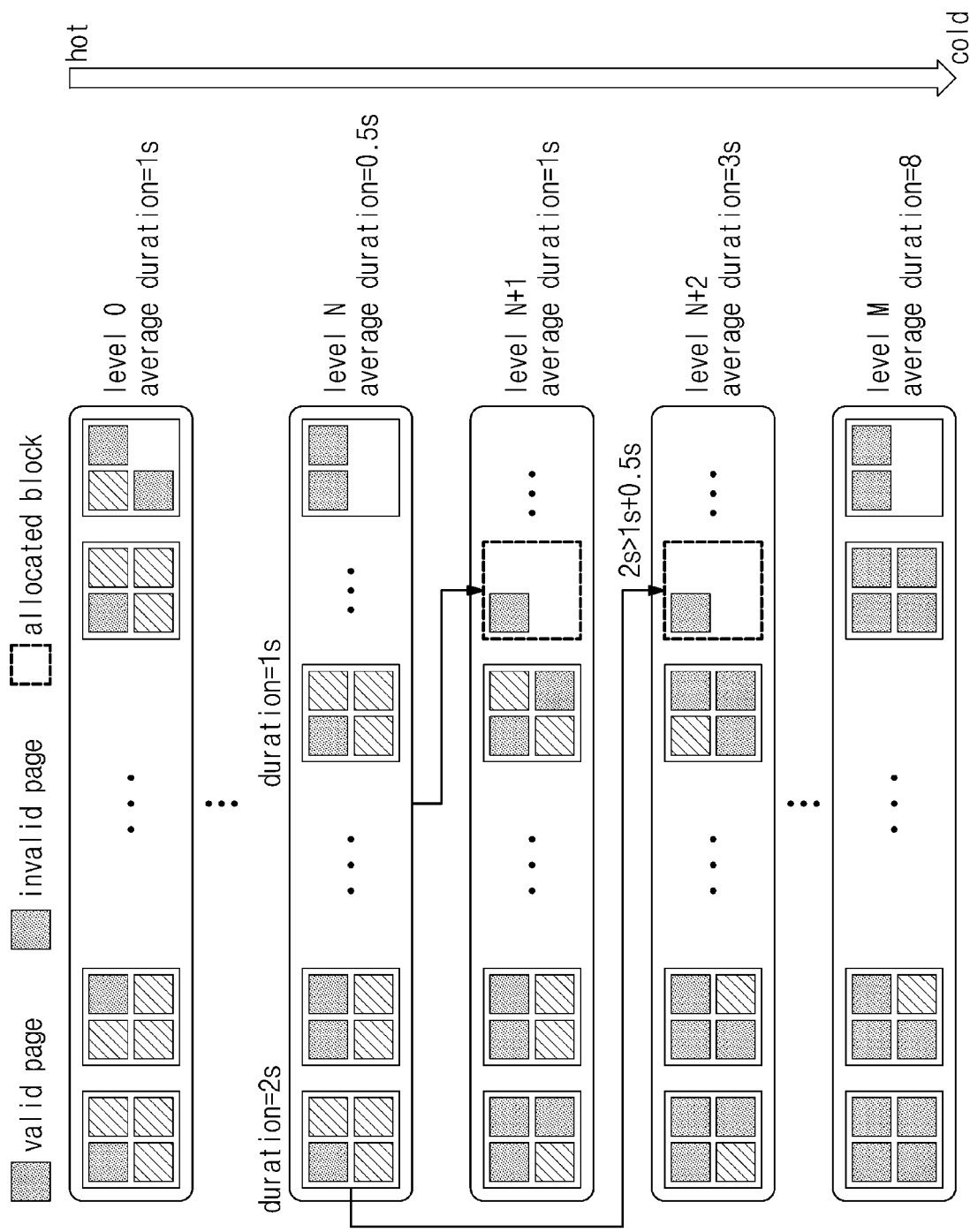
FIG. 5 is a schematic diagram of determining a level according to an example embodiment.

FIG. 4 illustrates a method of determining a level of a block according to an example embodiment. FIG. 5 is a schematic diagram of determining a level according to an example embodiment.

Referring to FIG. 4, in step S410, for a first block of an i-th level, the processor determines a data duration of the first block, the data duration of the first block being a difference between an erase time and a programming time of the first block Here, "" may be an integer greater than or equal to 0.

In one example, the data duration of the first block may be a difference between the most recent programming time and the most recent erase time of the first block. In some example embodiments, the block attribute table may include the most recent programming time and the most recent erase time of each block in the storage device.

Referring to FIG. 5, the level of the first block may be the Nth (i.e., N is equal to i) level. Only as an example, the blocks of level N (i.e., the Nth level) includes a block of which a duration is 2 seconds, a block of which a duration is 1 second, etc., on which the garbage collection operation is to be performed. The average duration of blocks of level N is 0.5 seconds.

In step S420, the processor 120 may determine, according to the data duration of the first block and an average data duration of at least one level among the i-th level to an M-th level, a level of a second block in which to store the valid data that is stored in the first block, and store the valid data that is stored in the first block into the determined second block.

Since the data duration of the first block and the data duration of blocks of other levels may be considered to determine the level of the second block for storing the valid data that is stored in the first block, the method of determining the level according to an example embodiment may settle the colder data to a higher level faster, so that the data of different heat levels may be separated faster, and the possibility of valid data being moved multiple times in multiple GCs is reduced.

In an example, if the data duration of the first block is greater than the sum of the average data durations of the i+1-th level and the i+2-th level, the processor 120 may store the valid data that is stored in the first block into the second block of which the level is the i+2 level.

Referring to FIG. 5 again, the average duration of blocks of level N+1 (i.e., i+1) is 1 second, and the average duration of blocks of level N+2 is 3 seconds. In this case, the duration of a block of which the duration is 2 seconds (2 s) is greater than the sum (1.5 s) of the average duration (0.5 s) of blocks of level N and the average duration (1 s) of blocks of level N+1. Accordingly, the processor 120 may determine that the level of the block for storing the valid data of the block whose duration is 2 seconds may be determined as level N+2, since the average duration of blocks of the level N+2 is 3 seconds, which is longer than the sum (1.5 s). The processor 120 may store the valid data that is stored in the first block (i.e., level N, duration 2 s) into the second block of which the level is the level N+2.

In another example, if the data duration of the first block is less than or equal to the sum of the average data durations of the i+1-th level and the i+2-th level, the processor 120 may store the valid data that is stored in the first block into the second block of which the level is the i+1-th level. Referring to FIG. 5 again, as an example only, the first block may be a block whose duration is 1 second (i.e., Level N, duration=1 s), on which the garbage collection operation is to be performed, among the blocks of the level N. The average duration of blocks of level N is 0.5 seconds, the average duration of blocks of level N+1 is 1 second, and the average duration of blocks of level N+2 is 3 seconds. In this case, the duration (1 s) of the first block is less than the sum (1.5 s) of the average duration (0.5 s) of blocks of level N and the average duration (1 s) of blocks of level N+1. In this situation, the processor 120 may determine a level of the second block for storing the valid data of the first block whose duration is 1 second as the level N+1, since the duration of the first block (i.e., Level N, duration=1 s) is less than the sum (1.5 s). The processor 120 may store the valid data that is in the first block having a duration of is into a second block of which the level is the level N+1.

However, the above examples are only exemplary, and example embodiments are not limited thereto. In some example embodiments, different levels may be determined based on the different relationships between the data duration of the first block and the data durations of blocks of other levels. For example, the level of the second block may be determined as the level of the first block based on the data duration of the level of the first block and the average data duration of the level next to the level of the first block, or the level of the second block may be determined as the next level of the first block. Although FIG. 5 shows the durations or the average duration of some blocks, the duration or the average duration of these blocks is only exemplary. The duration or the average duration of the blocks may be any other time.

In some example embodiments, the level of the second block may be determined based on various manners. For example, in some embodiments, the level of the second block may be determined to be the next level of the level of the first block. In another embodiment, the level of the second block may be determined to the level which is two levels higher than the level of the first block. However, example embodiments are not limited to thereof, and the level of the second block may be determined in other ways, as long as the level of the second block is not lower than the level of the first block.

Figure 6:
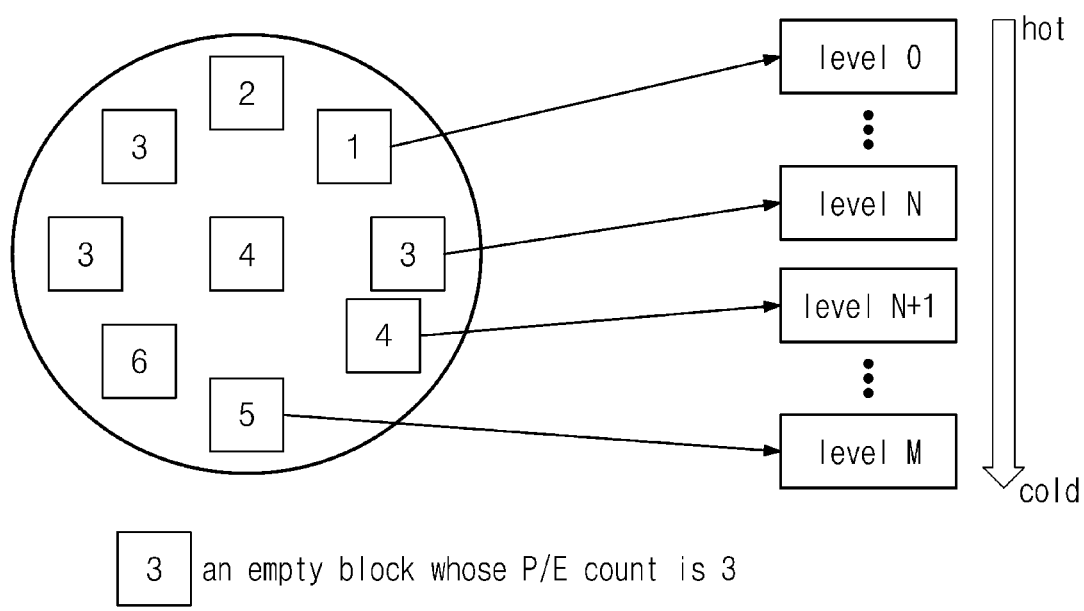
FIG. 6 is a schematic diagram of allocating empty blocks according to an example embodiment.

FIG. 6 is a schematic diagram of allocating empty blocks according to an example embodiment.

In some embodiments, the higher the level, the higher the program erase count of an allocated empty block.

Referring to FIG. 6, as an example only, empty blocks may have different program erase (P/E) counts 1, 2, 3, 4, 5, and 6. In FIG. 6, the number in the block indicates the program erase (P/E) count of the block. An empty block with a P/E count of 1 may be assigned to level 0, an empty block with a P/E count of 3 may be assigned to level N, an empty block with P/E count of 4 may be assigned to level N+1, and an empty block with a P/E count of 5 may be allocated to level M. Here, data of a high level is more likely to be cold data. However, example embodiments are not limited to the program erase counts shown in FIG. 6, and the program erase counts may be any other values.

In example embodiments, the processor 120 may allocate an empty block with a higher P/E count to a high level, and may allocate an empty block with a lower P/E count to a lower level. Therefore, a block with a higher P/E count stores colder data and a block with a lower P/E count stores hotter data. Thus, a block with a high P/E count stores cold data, and the possibility of the block being selected by the GC is greatly reduced, thereby balancing the P/E count of the blocks. In some example embodiments, the P/E count of the empty blocks may be roughly proportional to the level to which the empty blocks are allocated.

Figure 7:
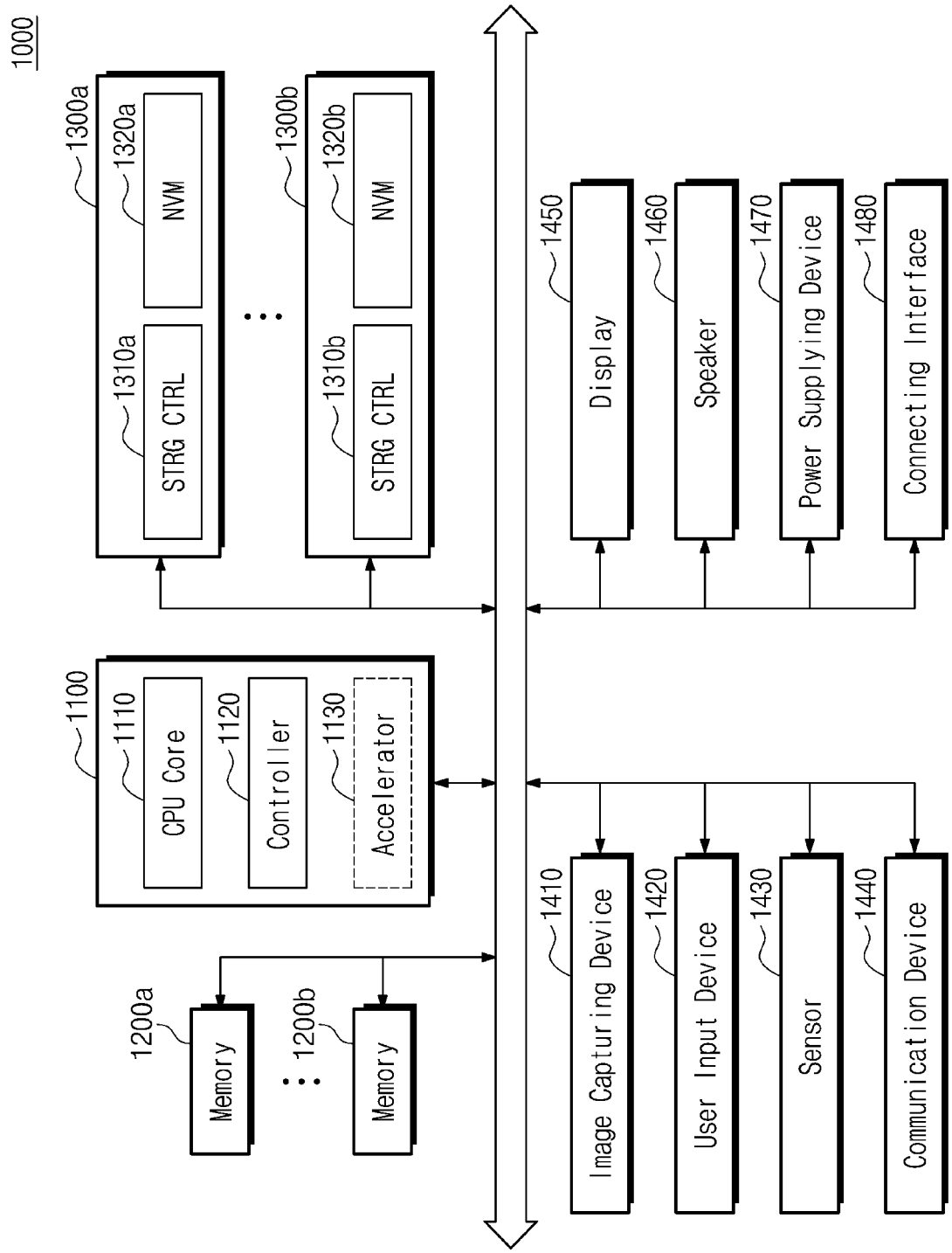
FIG. 7 is a diagram of a system to which a storage device is applied, according to an embodiment.

FIG. 7 is a diagram of a system 1000 to which a storage device is applied, according to an embodiment. The system 1000 of FIG. 7 may be a mobile system, such as a portable communication terminal (e.g., a mobile phone), a smartphone, a tablet personal computer (PC), a wearable device, a healthcare device, or an Internet of things (JOT) device, etc. However, the system 1000 of FIG. 7 is not necessarily limited to the mobile system and alternatively may be a PC, a laptop computer, a server, a media player, or an automotive device (e.g., a navigation device), etc.

Referring to FIG. 7, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

In some embodiments, the memories (e.g., 1200a and 1200b), and the storage devices (e.g., 1300a and 1300b) may be included in the device 100 for storing data of FIG. 1. For example, the memories (e.g., 1200a and 1200b), and the storage devices (e.g., 1300a and 1300b) may store data according to a method of storing data described with reference to at least one of FIGS. 2 to 6. That is, one of processors included in the system 1000 described with reference to FIG. 7 may correspond to the processor 120 and may perform the method of storing data described with reference to at least one of FIGS. 2 to 6.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. In some embodiments, each of the memories 1200a and 1200b may include a volatile memory, such as static random access memory (SRAM) and/or dynamic RAM (DRAM). In other embodiments, each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and Non-Volatile Memories (NVM) 1320a and 1320b configured to store data via the control of the storage controllers 1310a and 1310b. In some embodiments, the NVMs 1320a and 1320b may include flash memories having a two-dimensional (2D) structure or a three-dimensional (3D) V-NAND structure. In other embodiments, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attaCHment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 8:
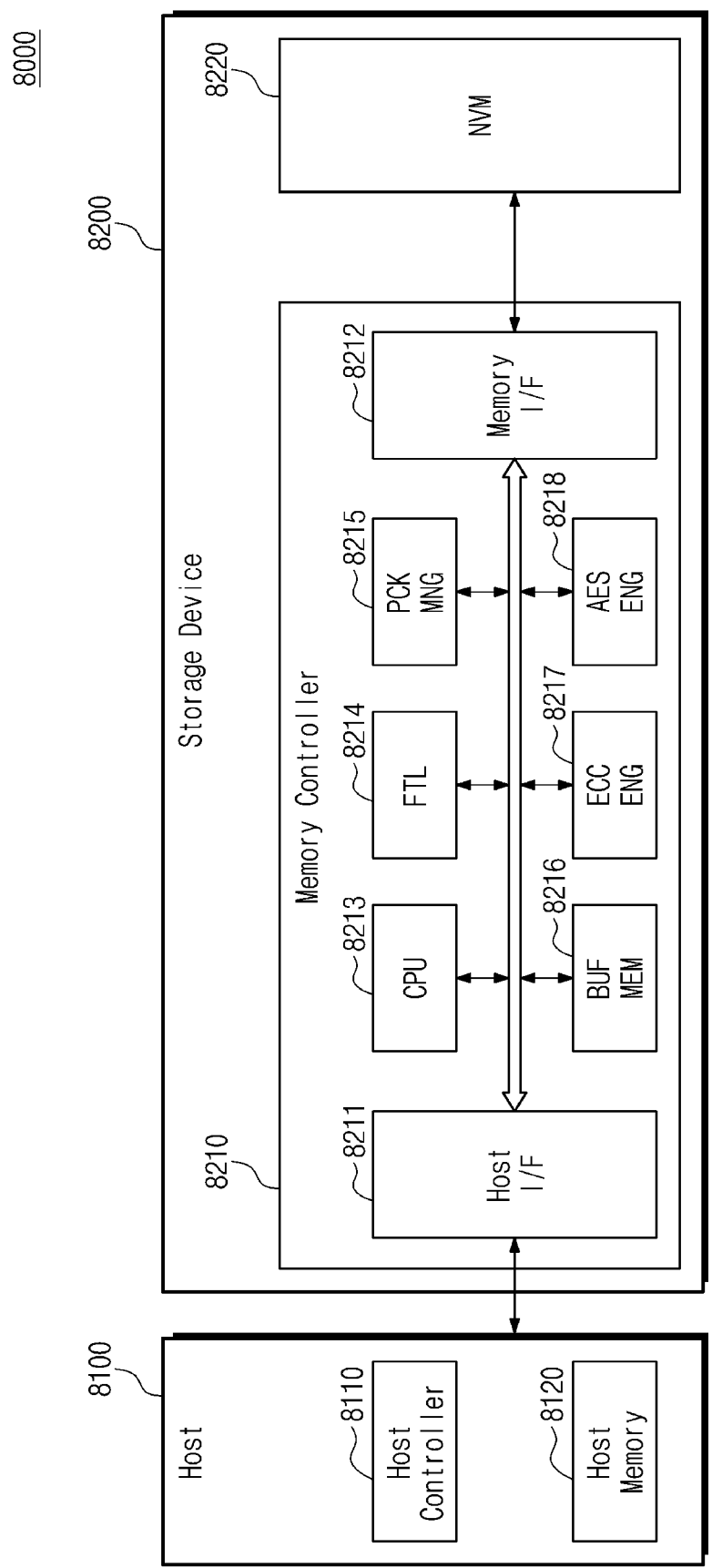
FIG. 8 is a block diagram of a host storage system according to an exemplary embodiment.

FIG. 8 is a block diagram of a host storage system 8000 according to an exemplary embodiment.

The host storage system 8000 may include a host 8100 and a storage device 8200. In addition, the storage device 8200 may include a memory controller 8210 and a NVM 8220. According to an exemplary embodiment, the host 8100 may include a host controller 8110 and a host memory 8120. The host memory 8120 may be used as a buffer memory configured to temporarily store data to be transmitted to or received from the storage device 8200.

In some embodiments, the host 8100 and the storage device 8200 may correspond to the device 100 for storing data of FIG. 1. For example, the host 8100 and/or the storage device 8200 may perform the method of storing data described with reference to at least one of FIGS. 2 to 6. That is, one of processors included in the host storage system 8000 described with reference to FIG. 8 may correspond to the processor 120 and may perform the method of storing data described with reference to at least one of FIGS. 2 to 6.

The storage device 8200 may include a storage medium configured to store data in response to a request from the host 8100. As an example, the storage device 8200 may include at least one of an SSD, an embedded memory, and a removable external memory. When the storage device 8200 is an SSD, the storage device 8200 may be an NVMe compliant device. When the storage device 8200 is an embedded memory or an external memory, the storage device 8200 may be a device conforming to the UFS standard or eMMC standard. Both the host 8100 and the storage device 8200 may generate a packet and send the packet according to the adopted standard protocol.

When the NVM 8220 of the storage device 8200 includes a flash memory, the flash memory may include a 2D NAND storage array or a 3D (or vertical) NAND (VNAND) storage array. As another example, the storage device 8200 may include various other kinds of NVMs. For example, the storage device 8200 may include magnetic random access memory (MRAM), spin transfer torque MRAM, conductive bridge RAM (CBRAM), ferroelectric RAM (FRAM), PRAM, RRAM, and various other types of memory.

According to an embodiment, the host controller 8110 and the host memory 8120 may be implemented as separate semiconductor chips. Alternatively, in some embodiments, the host controller 8110 and the host memory 8120 may be integrated in the same semiconductor chip. As an example, the host controller 8110 may be any one of a plurality of modules included in an application processor (AP). The AP can be implemented as a system on chip (SOC). In addition, the host memory 8120 may be an embedded memory included in the AP or a memory module external to the AP.

The host controller 8110 may manage an operation of storing data (e.g., write data) of the buffer area of the host memory 8120 in the NVM 8220 or an operation of storing data (E.G., read data) of the NVM 8220 in the buffer area.

The memory controller 8210 may include a host interface (UF) 8211, a memory interface (UF) 8212, and a CPU 8213. In addition, the memory controller 8210 may also include a flash conversion layer (FTL) 8124, a packet manager (PCK MNG) 8215, a buffer memory (BUF MEM) 8216, an error correction code engine (ECC ENG) 8217, and an advanced encryption standard engine (AES ENG) 8218. The memory controller 8210 may further include a working memory (not shown) in which the FTL 8124 is loaded. The CPU 8213 may execute FTL 8124 to control data write and read operations on the NVM 8220.

The host interface 8211 may send and receive packets to and from the host 8100. The packet sent from the host 8100 to the host interface 8211 may include commands or data to be written to the NVM 8220. The packet sent from the host interface 8211 to the host 8100 may include a response to a command or data read from the NVM 8220. The memory interface 8212 may send data to be written to the NVM 8220 or receive data read from the NVM 8220. The memory interface 8212 may be configured to comply with standard protocols such as toggle or open NAND flash interface (ONFI).

FTL 8124 may perform various functions, such as address mapping operation, wear balancing operation and garbage collection operation. The address mapping operation may be the operation of converting the logical address received from host 8100 into the physical address used to actually store data in NVM 8220. The wear balancing operation may prevent excessive degradation of specific blocks by allowing uniform use of NVM 8220 blocks Technology. As an example, the wear equalization operation may be realized by using firmware technology to balance the erase count of physical blocks. The garbage collection operation may be a technology to ensure the available capacity in NVM 8220 by erasing the existing blocks after copying the valid data of the existing blocks to the new blocks.

The packet manager 8215 may generate packets according to a protocol that agrees to the interface of the host 8100, or parse various types of information from packets received from the host 8100. In addition, the buffer memory 8216 may temporarily store data to be written to or read from the NVM 8220. Although the buffer memory 8216 may be a component included in the memory controller 8210, it does not buffer storage, the memory controller 8216 may be external to the memory controller 8210.

ECC engine 8217 may perform error detection and correction operations on the read data read from NVM 8220. More specifically, ECC engine 8217 may generate parity bits for the write data to be written to NVM 8220, and the generated parity bits may be stored in NVM 8220 together with the write data. During reading data from NVM 8220, ECC engine 8217 may use read Data and the parity bit read from NVM 8220 to correct the error in the read data, and output the read data after error correction.

The AES engine 8218 may perform at least one of an encryption operation and a decryption operation on the data input to the memory controller 8210 by using a symmetric key algorithm.

Figure 9:
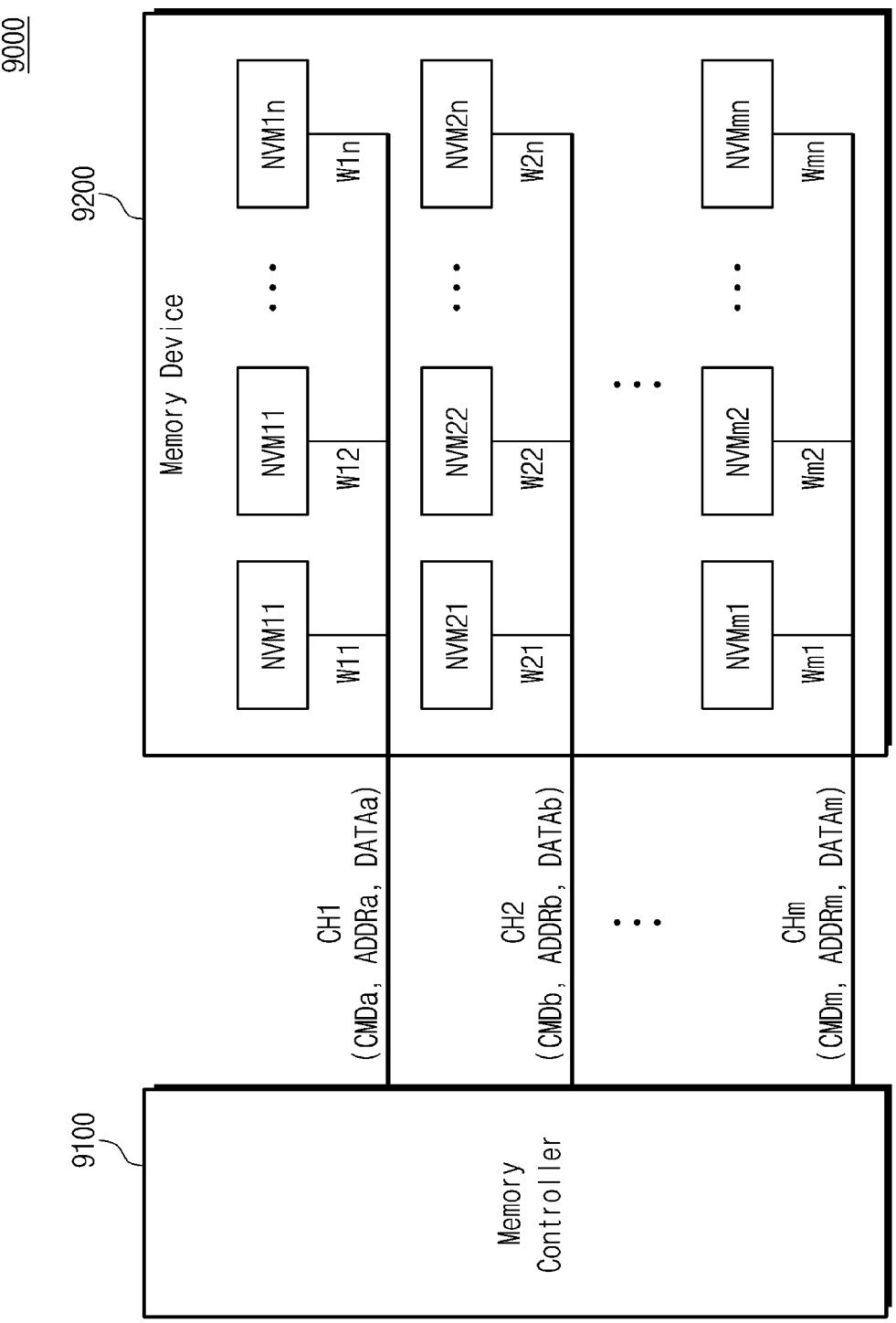
FIG. 9 is a block diagram of a storage system according to an embodiment.

FIG. 9 is a block diagram of a storage system 9000 according to an embodiment.

Referring to FIG. 9, the storage system 9000 may include a storage device 9200 and a memory controller 9100. The storage system 9000 may support multiple channels CH1 to CHM, and the storage device 9200 may be connected to the memory controller 9100 through multiple channels CH1 to CHM. For example, storage system 9000 may be implemented as a storage device such as an SSD.

In some embodiments, the storage system 9000 may correspond to the device 100 for storing data of FIG. 1. For example, the storage system 9000 may perform a method of storing data described with reference to at least one of FIGS. 2 to 6. That is, one of processors included in the storage system 9000 described with reference to FIG. 9 may correspond to the processor 120 and may perform the method of storing data described with reference to at least one of FIGS. 2 to 6.

The storage device 9200 may include a plurality of NVM devices NVM11 to NVMmn, where m and n are each integers. Each of the NVM devices NVM11 to NVMmn may be connected to one of the plurality of channels CH1 to CHM through its corresponding path. For example, NVM devices NVM11 to NVM1*n* may be connected to the first channel CH1 through paths W11 to Win, and NVM devices NVM21 to NVM2*n* may be connected to the second channel CH2 through paths W21 to W2*n*. In an exemplary embodiment, each of the NVM devices NVM11 to NVM1*n* may be implemented as any storage element, which may operate according to a separate command from the memory controller 9100. For example, each of the NVM devices NVM11 to NVM1*n* may be implemented as a chip or die, but example embodiments are not limited thereto.

The memory controller 9100 may send and receive signals to and from the storage device 9200 through the plurality of channels CH1 to CHM. For example, the memory controller 9100 may send commands CMDa to CMDm, addresses ADDRa to ADDRm, and data DATAa to DATAm to the storage device 9200 through channels CH1 to CHm, or receive data DATA DATAa to DATAm from the storage device 9200.

The memory controller 9100 may select one from the NVM devices NVM11 to NVMmn connected to each of the channels CH1 to CHM by using the corresponding one of the channels CH1 to CHm, and send and receive signals to and from the selected NVM device. For example, the memory controller 9100 may select the NVM device NVM11 from the NVM devices NVM11 to NVM1*n* connected to the first channel CH1. The memory controller 9100 may send the command CMDA, address ADDRa and data DATA to the selected NVM device NVM11 through the first channel CH1, or receive data DATA from the selected NVM device NVM11.

The memory controller 9100 may send and receive signals to and from the storage device 9200 in parallel through channels different from each other. For example, the memory controller 9100 may send the command CMDa to the storage device 9200 through the first channel CH1 and the command CMDb to the storage device 9200 through the second channel CH2. For example, the memory controller 9100 may receive data DATAa from the storage device 9200 through the first channel CH1 and data DATAb from the storage device 9200 through the second channel CH2.

The memory controller 9100 may control all operations of the storage device 9200. The memory controller 9100 may send signals to channels CH1 to CHM and control each of the NVM devices NVM11 to NVMmn connected to channels CH1 to CHm. For example, the memory controller 9100 may send a command CMDa and an address ADDRa to the first channel CH1 and control one selected from the NVM devices NVM11 to NVM1*n*.

Each of the NVM devices NVM11 to NVMmn may be operated via the control of the memory controller 9100. For example, the NVM device NVM11 may program the data DATAa based on the command CMDa, the address ADDRa, and the data DATAa provided to the first channel CH1. For example, the NVM device NVM21 may read the data DATAb based on the command CMDB and the address addb provided to the second channel CH2, and send the read data DATAb to the memory controller 9100.

Although FIG. 9 shows an example in which the storage device 9200 communicates with the memory controller 9100 through M channels and includes N NVM devices corresponding to each channel, the number of channels and the number of NVM devices connected to one channel may be changed.

Figure 10:
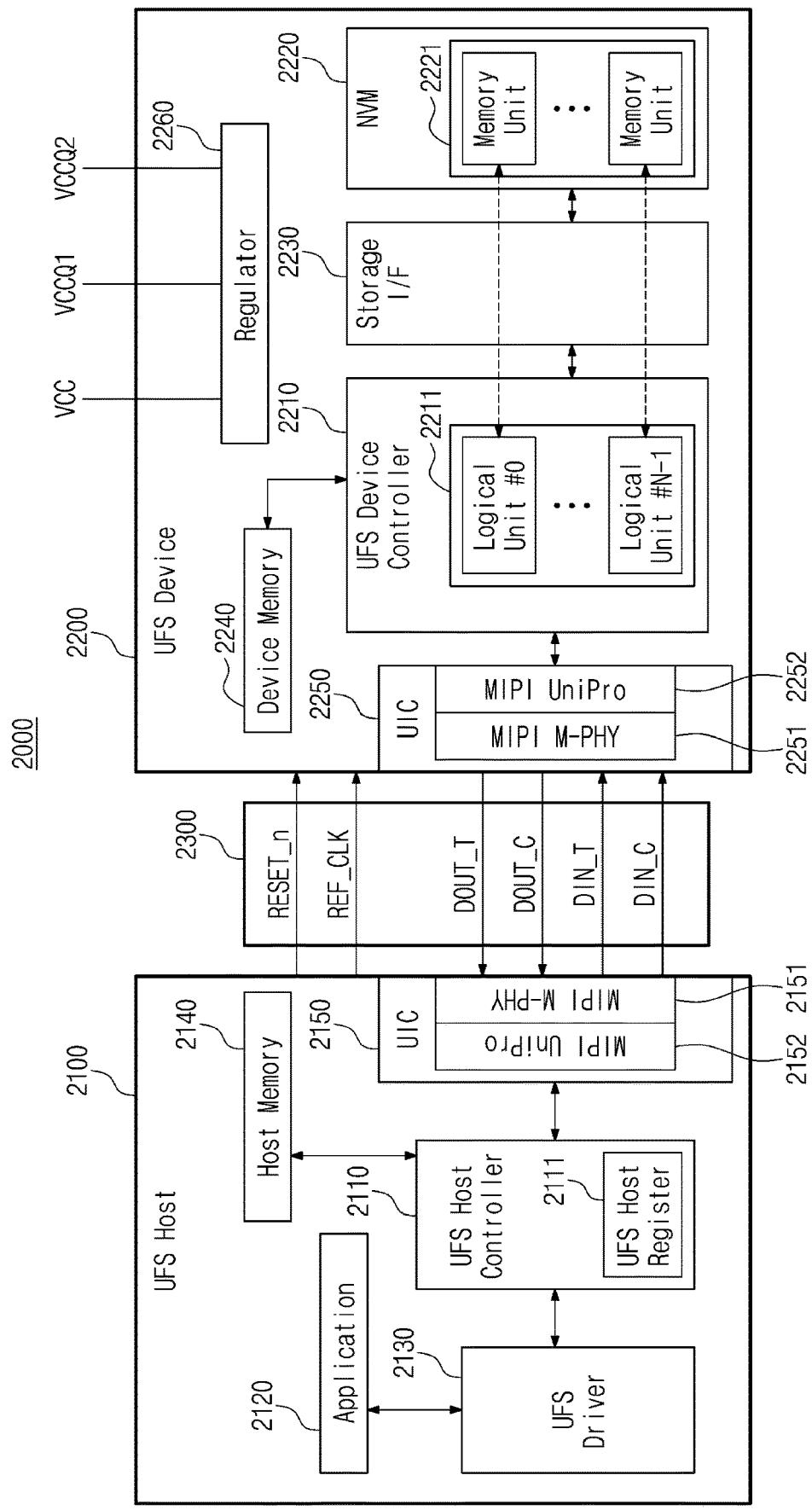
FIG. 10 is a diagram of an Universal Flash Memory (UFS) system according to an embodiment.

FIG. 10 is a diagram of an Universal Flash Memory (UFS) system 2000 according to an embodiment.

The UFS system 2000 may be a system conforming to a UFS standard announced by Joint Electron Device Engineering Council (JEDEC) and include a UFS host 2100, a UFS device 2200, and a UFS interface 2300. The description of the system 1000 with reference to FIG. 10 may also be applied to the UFS system 2000 of FIG. 10 to the extent that the description does not conflict with the following description of FIG. 10.

In some embodiments, the UFS host 2100 and/or the UFS device 2200 may correspond to the device 100 for storing data of FIG. 1. For example, the UFS host 2100 and/or the UFS device 2200 may perform a method of storing data described with reference to at least one of FIGS. 2 to 6. That is, one of processors included in the UFS system 2000 described with reference to FIG. 10 may correspond to the processor 120 and may perform the method of storing data described with reference to at least one of FIGS. 2 to 6.

Referring to FIG. 10, the UFS host 2100 may be connected to the UFS device 2200 through the UFS interface 2300. When the main processor 1100 of FIG. 10 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 10. The UFS device 2200 may correspond to the storage device 1300a and 1300b of FIG. 10, and a UFS device controller 2210 and an NVM 2220 may respectively correspond to the storage controllers 1310a and 1310b and the NVMs 1320a and 1320b of FIG. 10.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. In some embodiments, each of the memory units 2221 may include a V-NAND flash memory having a 2D structure or a 3D structure. In other embodiments, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 10, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 10, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 11:
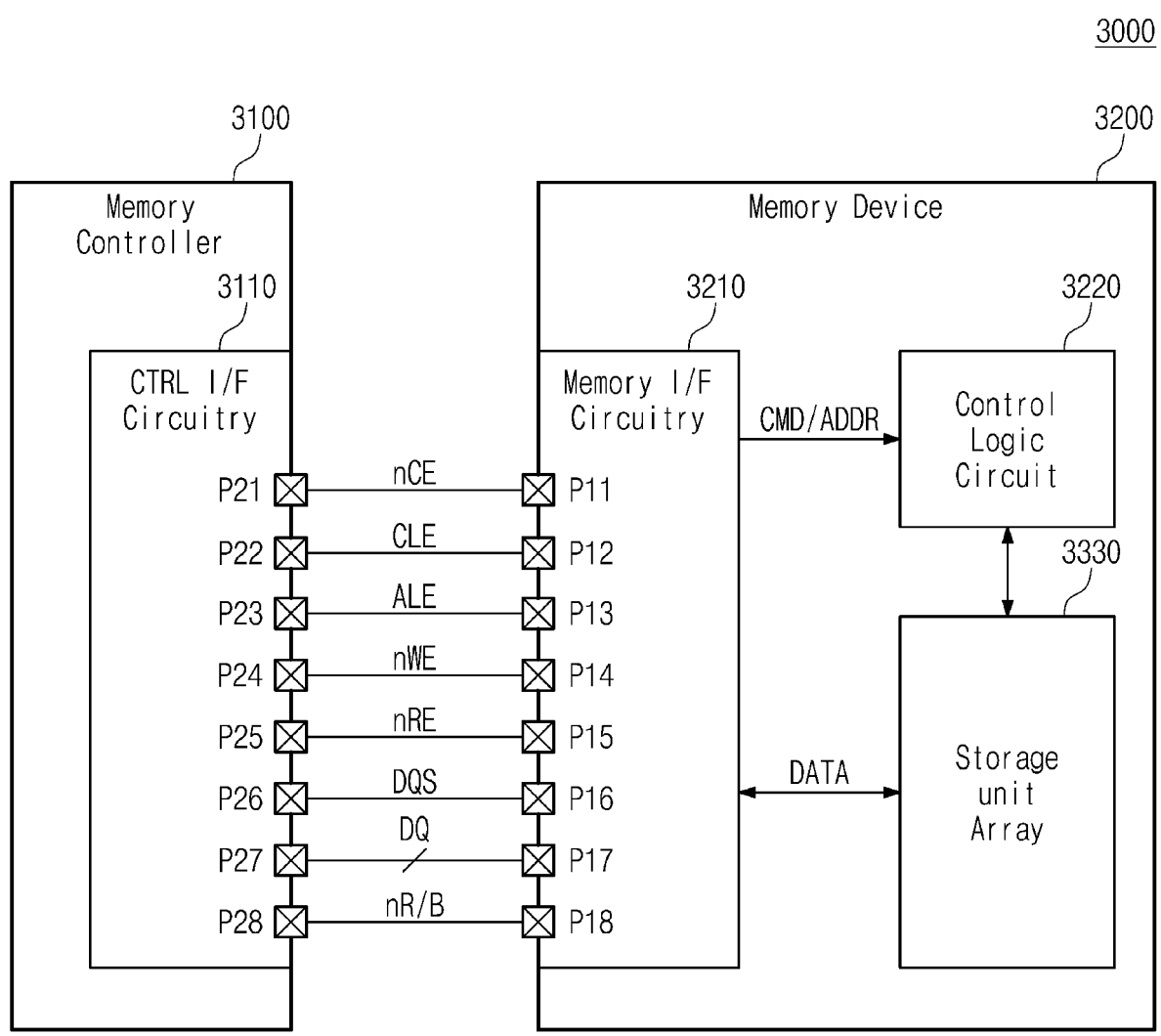
FIG. 11 is a block diagram of a storage system according to an embodiment.

FIG. 11 is a block diagram of a storage system 3000 according to an embodiment. Referring to FIG. 11, the storage system 3000 may include a storage device 3200 and a memory controller 3100. The storage device 3200 may correspond to one of the NVM devices NVM11 to NVMmn, which communicates with the memory controller 9100 based on one of the plurality of channels CH1 to CHm of FIG. 9. The memory controller 3100 may correspond to the memory controller 9100 of FIG. 9.

In some embodiments, the storage system 3000 may correspond to the device 100 for storing data of FIG. 1. For example, the memory controller 3100 and/or the controller logic 3220 may perform a method of storing data described with reference to at least one of FIGS. 2 to 6.

The storage device 3200 may include first to eighth pins P11 to P18, a memory interface (I/F) circuit 3210, a control logic circuit 3220, and a storage unit array 3330.

The memory interface circuit 3210 may receive the chip enable signal nCE from the memory controller 3100 through the first pin P11. The memory interface circuit 3210 may send and receive signals to and from the memory controller 3100 through the second to eighth pins p12 to P18 in response to the chip enable signal nCE. For example, when the chip enable signal nCE is in the enable state (E.G., low level), the memory interface circuit 3210 may send a signal to and receive a signal from the memory controller 3100 through the second to eighth pins p12 to P18.

The memory interface circuit 3210 may receive a command latch enable signal CLE, an address latch enable signal ALE, and a write enable signal nWE from the memory controller 3100 through the second to fourth pins p12 to P14. The memory interface circuit 3210 may receive the data signal DQ from the memory controller 3100 through the seventh pin p17 or send the data signal DQ to the memory controller 3100. Command CMD, address ADDR and data may be transmitted via data signal DQ. For example, the data signal DQ may be transmitted through a plurality of data signal lines. In this case, the seventh pin p17 may include a plurality of pins corresponding to a plurality of data signals DQ, respectively.

The memory interface circuit 3210 may obtain the command CMD from the data signal DQ received in the enable interval (E.G., high-level state) of the command latch enable signal CLE based on the switching time point of the write enable signal nWE. The memory interface circuit 3210 may obtain the address ADDR from the data signal DQ received in the enable interval (E.G., high-level state) of the address latch enable signal ALE based on the switching time point of the write enable signal nWE.

In an exemplary embodiment, the write enable signal nWE may remain static (E.G., high level or low level) and switch between high level and low level. For example, the write enable signal nWE may be switched in the interval where the command CMD or address ADDR is sent. Therefore, the memory interface circuit 3210 may obtain the command CMD or address ADDR based on the switching time point of the write enable signal nWE.

The memory interface circuit 3210 may receive the read enable signal nRE from the memory controller 3100 through the fifth pin P15. The memory interface circuit 3210 may receive the data strobe signal DQS from the memory controller 3100 through the sixth pin p16, or may send the data strobe signal DQS to the memory controller 3100.

In the data (DATA) output operation of the storage device 3200, the memory interface circuit 3210 may receive the read enable signal nRE switched by the fifth pin p15 before outputting the data DATA. The memory interface circuit 3210 may generate a data strobe signal DQS, which is switched based on the switching of the read enable signal nRE. For example, the memory interface circuit 3210 may generate a data strobe signal DQS based on the switching start time of the read enable signal nRE, which starts switching after a predetermined delay (E.G., tDQSRE). The memory interface circuit 3210 may transmit a data signal DQ including data DATA based on the switching time point of the data strobe signal DQS. Therefore, the data DATA may be aligned with the switching time point of the data strobe signal DQS and transmitted to the memory controller 3100.

In the data (DATA) input operation of the storage device 3200, when the data signal DQ including data DATA is received from the memory controller 3100, the memory interface circuit 3210 may receive the switched data strobe signal DQ and data DATA. The memory interface circuit 3210 may obtain data DATA from the data signal DQ based on the switching time point of the data strobe signal DQS. For example, the memory interface circuit 3210 may sample the data signal DQ at the rising and falling edges of the data strobe signal DQS and obtain data DATA.

The memory interface circuit 3210 may send the ready/busy output signal nR/B to the memory controller 3100 through the eighth pin P18. The memory interface circuit 3210 may transmit the status information of the storage device 3200 to the memory controller 3100 through the ready/busy output signal nR/B. When the storage device 3200 is in a busy state (i.e., when an operation is being performed in the storage device 3200), the memory interface circuit 3210 may send a ready/busy output signal nR/B indicating the busy state to the memory controller 3100. When the storage device 3200 is in the ready state (i.e., when no operation is performed or completed in the storage device 3200), the memory interface circuit 3210 may send the ready/busy output signal nR/B indicating the ready state to the memory controller 3100. For example, when the storage device 3200 reads data from the storage unit array 3330 in response to a page reading command, the memory interface circuit 3210 may send a ready/busy output signal nR/B indicating a busy state (E.G., low level) to the memory controller 3100. For example, when the storage device 3200 programs the data DATA to the storage unit array 3330 in response to the programming command, the memory interface circuit 3210 may send the ready/busy output signal nR/B indicating the busy state to the memory controller 3100.

The control logic circuit 3220 may control all operations of the storage device 3200. The control logic circuit 3220 may receive a command/address CMD/ADDR obtained from the memory interface circuit 3210. The control logic circuit 3220 may generate control signals for controlling other components of the storage device 3200 in response to the received command/address CMD/ADDR. For example, the control logic circuit 3220 may generate various control signals for programming data DATA to or reading data DATA from the storage unit array 3330.

The storage unit array 3330 may store the data DATA obtained from the memory interface circuit 3210 via the control of the control logic circuit 3220. The storage unit array 3330 may output the stored data DATA to the memory interface circuit 3210 via the control of the control logic circuit 3220.

The storage unit array 3330 may include a plurality of storage units. For example, a plurality of storage units may be flash memory units. However, example embodiments are not limited to this, and the storage unit may be an RRAM unit, a FRAM unit, a PRAM unit, a thyristor RAM (TRAM) unit or an MRAM unit. Hereinafter, an embodiment in which the storage unit is a NAND flash memory unit will be mainly described.

The memory controller 3100 may include first to eighth pins P21 to P28 and a controller interface (I/F) circuit 3110. The first to eighth pins P21 to P28 may correspond to the first to eighth pins P11 to P18 of the storage device 3200, respectively.

The controller interface circuit 3110 may send the chip enable signal nCE to the storage device 3200 through the first pin P21. The controller interface circuit 3110 may send a signal to and receive a signal from the storage device 3200 through the second to eighth pins P22 to P28, wherein the storage device 3200 is selected by the chip enable signal nCE.

The controller interface circuit 3110 may send the command latch enable signal CLE, the address latch enable signal ALE and the write enable signal nWE to the storage device 3200 through the second to fourth pins P22 to P24. The controller interface circuit 3110 may send or receive the data signal DQ to or from the storage device 3200 through the seventh pin p27.

The controller interface circuit 3110 may transmit the data signal DQ including the command CMD or address ADDR and the switched write enable signal nWE to the storage device 3200. The controller interface circuit 3110 may transmit the data signal DQ including the command CMD to the storage device 3200 by transmitting the command latch enable signal CLE with the enable state. Moreover, the controller interface circuit 3110 may transmit the data signal DQ including the command CMD to the storage device 3200 through an address latch enable signal ALE having an enable state is transmitted to transmit a data signal DQ including an address ADDR to the storage device 3200.

The controller interface circuit 3110 may send the read enable signal nRE to the storage device 3200 through the fifth pin P25. The controller interface circuit 3110 may receive the data strobe signal DQS from the storage device 3200 or send the data strobe communication signal DQS to the storage device 3200 through the sixth pin P26.

In the data (DATA) output operation of the storage device 3200, the controller interface circuit 3110 may generate a switched read enable signal nRE and send the read enable signal nRE to the storage device 3200. For example, before outputting the data DATA, the controller interface circuit 3110 may generate a read enable signal nRE from a static state (e.g., high level or low level) Therefore, the storage device 3200 may generate the switched data strobe signal DQS based on the read enable signal nRE. The controller interface circuit 3110 may receive the data signal DQ including data DATA and the switched data strobe signal DQS from the storage device 3200. The controller interface circuit 3110 may obtain data DATA from the data signal DQ based on the switching time point of the data strobe signal DQS.

During the data (DATA) input operation of the storage device 3200, the controller interface circuit 3110 may generate a switched data strobe signal DQS. For example, before transmitting the data DATA, the controller interface circuit 3110 may generate a data strobe signal DQS from a static state (E.G., high level or low level), which may transmit the data signal DQ including the data DATA to the storage device 3200 based on the switching time point of the data strobe signal DQS.

The controller interface circuit 3110 may receive the ready/busy output signal NR/B from the storage device 3200 through the eighth pin P28. The controller interface circuit 3110 may determine the status information of the storage device 3200 based on the ready/busy output signal nR/B.

Figure 12:
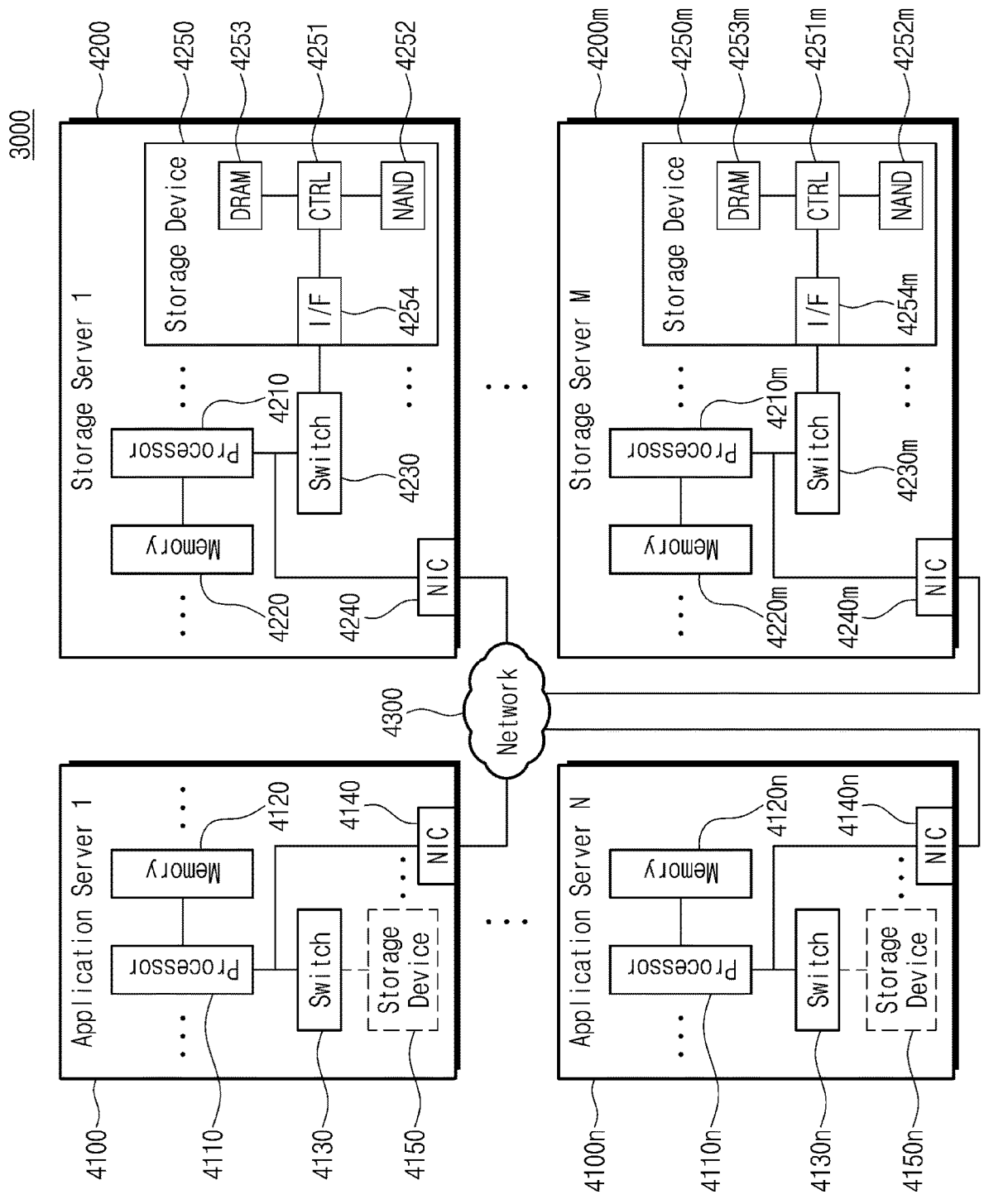
FIG. 12 is a block diagram of a data center to which a storage device is applied according to an embodiment.

FIG. 12 is a block diagram of a data center 4000 to which a storage device is applied according to an embodiment.

Referring to FIG. 12, the data center 4000 may be a facility for collecting various types of data and providing services, and is referred to as a data storage center. The data center 4000 may be a system for operating search engines and databases, and may be a computing system used by companies (such as banks) or government agencies. The data center 4000 may include application servers 4100 to 4100n and storage servers 4200 to 4200m. According to an embodiment, the number of applications 4100 to 4100n and the number of storage servers 4200 to 4200m may be selected differently. The number of application servers 4100 to 4100n and the number of storage servers 4200 to 4200m may be different from each other.

In some embodiments, the storage server 4200 and/or the application server 4100 may correspond to the device 100 for storing data of FIG. 1. For example, the storage server 4200 and/or the application server 4100 may perform a method of storing data described with reference to at least one of FIGS. 2 to 6. That is, one of processors included in the storage server 4200 or the application server 4100 described with reference to FIG. 12 may correspond to the processor 120 and may perform the method of storing data described with reference to at least one of FIGS. 2 to 6.

The application server 4100 or the storage server 4200 may include processors 4110 and 4210 and at least one of memories 4120 and 4220. The storage server 4200 will now be described as an example. The processor 4210 may control all operations of the storage server 4200, access the memory 4220, and execute instructions and/or data loaded into the memory 4220. The memory 4220 may be a dual data rate synchronous DRAM (DDR SDRAM), a high bandwidth memory (HBM), a hybrid memory cube (HMC), a dual in-line memory module (DIMM), an otane DIMM, or a nonvolatile DIMM (NVMDIMM). In some embodiments, the number of processors 4210 and memory 4220 included in the storage server 4200 may be selected differently. In some embodiments, processor 4210 and memory 4220 may provide a processor-memory pair. In some embodiments, the number of processors 4210 and the number of memories 4220 may be different from each other. The processor 4210 may include a single core processor or a multi-core processor. The above description of the storage server 4200 may be similarly applied to the application server 4100. In some embodiments, the application server 4100 may not include a storage device 4150. The storage server 4200 may include at least one storage device 4250. According to an embodiment, the number of storage devices 4250 included in the storage server 4200 may be selected differently.

Application servers 4100 to 4100n may communicate with storage servers 4200 to 4200m through network 4300. The network 4300 may be implemented by using fibre channel (FC) or Ethernet. In this case, FC may be a medium for relatively high-speed data transmission, and optical switches with high performance and high availability may be used. According to the access method of the network 4300, the storage servers 4200 to 4200m may be set as file storage, block storage or object storage.

In some embodiments, the network 4300 may be a network dedicated to storage, such as a storage area network (SAN). For example, a San may be a FC-SAN that uses an FC network and is implemented according to the FC protocol (FCP). As another example, the San may be an Internet Protocol (IP)-SAN, which uses a transmission control protocol (TCP)/IP network and is implemented according to SCSI over TCP/IP or Internet SCSI (iSCSI) protocol. In another embodiment, the network 4300 may be a general-purpose network, such as a TCP/IP network. For example, the network 4300 may be implemented according to protocols such as FC (FCoE) over Ethernet, network attached storage (NAS), and fabric nvme (NVMe-of).

Hereinafter, the application server 4100 and the storage server 4200 will be mainly described. The description of the application server 4100 may be applied to another application server 4100n, and the description of the storage server 4200 may be applied to another storage server 4200m.

The application server 4100 may store the data requested to be stored by the user or the client in one of the storage servers 4200 to 4200m through the network 4300. In addition, the application server 4100 may obtain data requested to be read by a user or a client from one of the storage servers 4200 to 4200m through the network 4300. For example, the application server 4100 may be implemented as a network server or a database management system (DBMS).

The application server 4100 may access the memory 4120n or the storage device 4150n included in another application server 4100n through the network 4300. Alternatively, the application server 4100 may access the memories 4220 to 4220m or storage devices 4250 to 4250m included in the storage servers 4200 to 4200m through the network 4300. Therefore, the application server 4100 may perform various operations on the data stored in the application servers 4100 to 4100n and/or the storage servers 4200 to 4200m. For example, the application server 4100 may execute instructions for moving or copying data between the application servers 4100 to 4100*n* and/or the storage servers 4200 to 4200*m*. In this case, data may be moved from the storage devices 4250 to 4250*m* of the storage servers 4200 to 4200*m* through the memories 4220 to 4220*m* of the storage servers 4200 to 4200*m* or directly to the memories 4120 to 4120*n* of the application servers 4100 to 4100*n*. The data moved through the network 4300 may be data encrypted for security or privacy.

The storage server 4200 will now be described as an example. The interface 4254 may provide a physical connection between the processor 4210 and the controller 4251 and a physical connection between the network interface card (NIC) 4240 and the controller 4251. For example, the interface 4254 may be implemented using a direct attached storage (DAS) scheme, where the storage device 4250 is directly connected to a dedicated cable. For example, interface 4254 may be implemented by using various interface schemes, such as ATA, SATA, E-SATA, SCSI, SAS, PCI, PCIe, nvme, IEEE 1394, USB interface, SD card interface, MMC interface, eMMC interface, UFS interface, eUFS interface and CF card interface.

The storage server 4200 may further include a switch 4230 and a network interconnect (NIC) 4240. The switch 4230 may selectively connect the processor 4210 to the storage device 4250 via the control of the processor 4210, or selectively connect the NIC 4240 to the storage device 4250.

In some embodiments, NIC 4240 may include a network interface card and a network adapter. NIC 4240 may be connected to network 4300 through wired interface, wireless interface, Bluetooth interface or optical interface. The NIC 4240 may include an internal memory, a digital signal processor (DSP), and a host bus interface, and is connected to the processor 4210 and/or the switch 4230 through the host bus interface. The host bus interface may be implemented as one of the above examples of interface 4254. In some embodiments, NIC 4240 may be integrated with at least one of processor 4210, switch 4230, and storage device 4250.

In storage servers 4200 to 4200*m* or application servers 4100 to 4100*n*, the processor 120 may send commands to storage devices 4150 to 4150*n* and 4250 to 4250*m* or memories 4120 to 4120*n* and 4220 to 4220*m* and program or read data. In this case, the data may be the wrong data corrected by the ECC engine. The data may be data on which a data bus inversion (DBI) operation or a data masking (DM) operation is performed, and may include cyclic redundancy coding (CRC) information. Data may be encrypted for security or privacy.

The storage devices 4150 to 4150*n* and 4250 to 4250*m* may send control signals and command/address signals to the NAND flash memory devices 4252 to 4252*m* in response to a read command received from the processor. Therefore, when reading data from the NAND flash memory devices 4252 to 4252*m*, the read enable (RE) signal may be input as the data output control signal. Therefore, the data may be output to the DQ bus. The RE signal may be used to generate the data strobe signal DQS. Depending on the rising or falling edge of the write enable (WE) signal, the command and address signals may be locked in the page buffer.

The controller 4251 may control all operations of the storage device 4250. In some embodiments, the controller 4251 may include a SRAM. The controller 4251 may write data to the NAND flash memory device 4252 in response to a write command or read data from the NAND flash memory device 4252 in response to a read command. For example, write commands and/or read commands may be provided from processor 4210 of storage server 4200, processor 4210*m* of another storage server 4200*m*, or processors 4110 and 4110*n* of application servers 4100 and 4100*n*. The DRAM 3253 may temporarily store (or buffer) data to be written to or read from the NAND flash memory device 4252. Also, DRAM 3253 may store metadata. Here, the metadata may be user data or data generated by the controller 4251 for managing the NAND flash memory device 4252. The storage device 4250 may include a security element (SE) for security or privacy.

The various example embodiments described herein may be applied to any storage apparatus including a non-volatile memory device. For example, various example embodiments may be applied to SSD, NVMe, eMMC, UFS, etc.

According to various example embodiments, the method of storing data may store the valid data in the first block into the second block of a level not lower than the level of the first block in the garbage collection (GC), so that the valid data to be stored (or copied) is stored hierarchically in different blocks to reduce the possibility of multiple GCs for data (especially data with a long life cycle called cold data), thereby reducing write amplification and improving the performance of the storage apparatus.

The method of storing data according to various example embodiments may assign different levels to hot blocks and cold blocks in advance according to the properties of the blocks for subsequent garbage collection, thereby when using hot and cold blocks with different levels to perform garbage collection, it may reduce the possibility of multiple GCs for data, thereby reducing write amplification and improving the performance of the storage apparatus.

The method of storing data various example embodiments may configure empty blocks according to the cases of empty blocks of different levels, so as to meet the needs of data migration in garbage collection.

The method of storing data various example embodiments may allocate empty blocks to the levels based on the program/erase counts of the empty blocks, so that the program/erase count of the blocks may be balanced.

According to the method of storing data various example embodiments, when allocating empty blocks, the program/erase counts of the empty blocks assigned to a relatively high level may not be lower than the program/erase count of the empty blocks assigned to a relatively low level, so that the program/erase counts of blocks may be balanced, and it is more conducive to wear-leveling and may improve the life of the storage apparatus.

The method of storing data various example embodiments may consider the data duration of the first block and the data durations of blocks of other levels to determine the level of the second block for storing the valid data in the first block, thus, the method of determining the level according to the present invention may settle the colder data to a higher level faster, so that the data of different heat levels may be separated faster, and the possibility of valid data being moved multiple times in multiple GCs is reduced.

According to one or more example embodiments, the above-described processor may be implemented using a combination of hardware, hardware, and software, or a non-transitory storage medium storing executable software for performing its functions.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the example embodiments. Accordingly, all such modifications are intended to be included within the scope of example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of storing data, the method comprising:
   receiving a message to perform garbage collection on a first block of a plurality of blocks included in a storage apparatus; and
   based on the message, performing the garbage collection on the first block by determining a second block that has a level among a plurality of levels that is greater than or equal to a level of the first block among the plurality of levels and storing valid data that is stored in the first block into the second block,
   wherein level information of the plurality of blocks is stored in association with the plurality of blocks in a block attribute table,
   wherein the block attribute table includes a program/erase count of each of the plurality of blocks, and wherein the level of the first block and the level of the second block are based on the program/erase count of the first block and the second block, respectively, indicated in the block attribute table.

2. The method according to claim 1, wherein the plurality of levels comprise a zeroth level to an Mth level, M being a positive integer, and
at least a portion of the plurality of blocks included in the storage apparatus are configured to have levels among the zeroth level to the Mth level.

3. The method according to claim 2, wherein, when blocks among the at least the portion of the plurality of blocks that have a level corresponding to the level of the second block cannot be written, configuring an empty block with the level of the second block.

4. The method according to claim 3, wherein configuring the empty block includes: configuring an empty block having a first program/erase count to have the level of the second block, wherein the first program/erase count is greater than or equal to a second program/erase count of an empty block configured for a level lower than the level of the second block.

5. The method according to claim 1, wherein the plurality of levels comprise a zeroth level to an Mth level, M being a positive integer, and
after receiving the message and before performing the garbage collection, the method further comprises:
when the first block does not have a level, configuring a level of the first block as the zeroth level among the plurality of levels.

6. The method according to claim 1, wherein the block attribute table further includes a programming time and an erasing time of each of the plurality of blocks,
wherein the level of the first block is an i-th level of the plurality of levels,
wherein performing the garbage collection includes:
determining a data duration of the first block, the data duration being a difference between the erasing time and the programming time of the first block;
determining the level of the second block according to the data duration of the first block and an average data duration of each level among the i-th level to an Mth level, and storing the valid data that is stored in the first block into the second block, and
wherein, the average data duration of a level is an average value of data durations of all blocks of the level.

7. The method according to claim 6, wherein when the data duration of the first block is greater than a sum of average data durations of an i+1-th level and an i+2-th level, the valid data that is stored in the first block is stored in the second block having the i+2-th level.

8. The method according to claim 1, further comprising, after performing garbage collection on the first block, configuring the level of the first block as a zeroth level among the plurality of levels.

9. An electronic system comprising:
a main memory;
a storage device; and
a main processor configured to control at least one of the main memory and the storage device to store data according to the method claim 1.

10. A device comprising:
a storage apparatus that is divided into a plurality of blocks; and
a processor configured to:
receive a message to perform garbage collection on a first block of the plurality of blocks; and
based on the message, performing the garbage collection on the first block by determining a second block that has a level among a plurality of levels that is greater than or equal to a level of the first block among the plurality of levels and storing valid data that is stored in the first block into the second block,
wherein level information of the plurality of blocks is stored in association with the plurality of blocks in a block attribute table,
wherein the block attribute table includes a program/erase count of each of the plurality of blocks, and
wherein the level of the first block and the level of the second block are based on the program/erase count of the first block and the second block, respectively, indicated in the block attribute table.

11. The device according to claim 10, wherein the plurality of levels comprise a zeroth level to an Mth level, M being a positive integer, and
at least a portion of the plurality of blocks included in the storage apparatus are configured to have levels among the zeroth level to the Mth level.

12. The device according to claim 11, wherein the processor is further configured to, when blocks among the at least the portion of the plurality of blocks that have a level corresponding to the level of the second block cannot be written, configuring an empty block with the level of the second block.

13. The device according to claim 12, wherein the processor is further configured to: configure an empty block having a first program/erase count to have the level of the second block, wherein the first program/erase count is greater than or equal to a second program/erase count of an empty block configured for a level lower than the level of the second block.

14. The device according to claim 10, wherein the plurality of levels comprise a zeroth level to an Mth level, M being a positive integer, and
wherein, after receiving the message and before performing the garbage collection, the processor is further configured to, when the first block does not have a level, configuring a level of the first block as the zeroth level among the plurality of levels.

15. The device according to claim 10, wherein the block attribute table further includes a programming time and an erasing time of each of the plurality of blocks,
wherein the level of the first block is an i-th level of the plurality of levels,
wherein, to perform the garbage collection, the processor is configured to:
determine a data duration of the first block, the data duration being a difference between the erasing time and the programming time of the first block; and
determining the level of the second block according to the data duration of the first block and an average data duration of each level among the i-th level to an Mth level, and storing the valid data that is stored in the first block into the second block, and
wherein, the average data duration of a level 1 is an average value of data durations of all blocks of the level.

16. The device according to claim 15, wherein, when the data duration of the first block is greater than a sum of average data durations of an i+1-th level and an i+2-th level, the valid data that is stored in the first block is stored in the second block having the i+2-th level.

17. The device according to claim 10, wherein the processor is further configured to, after performing the garbage collection on the first block, configure the level of the first block as a zeroth level among the plurality of levels.

18. A non-transitory computer-readable storage medium storing a computer program, which, when executed by a processor, causes the processor to at least:
  receive a message to perform garbage collection on a first block of a plurality of blocks included in a storage apparatus; and
  based on the message, perform the garbage collection on the first block by determining a second block that has a level among a plurality of levels that is greater than or equal to a level of the first block among the plurality of levels and storing valid data that is stored in the first block into the second block,
  wherein level information of the plurality of blocks is stored in association with the plurality of blocks in a block attribute table,
  wherein the block attribute table includes a program/erase count of each of the plurality of blocks, and
  wherein the level of the first block and the level of the second block are based on the program/erase count of the first block and the second block, respectively, indicated in the block attribute table.

\* \* \* \* \*